United States Patent
Guo et al.

(10) Patent No.: US 8,775,636 B2
(45) Date of Patent: Jul. 8, 2014

(54) SYSTEM AND METHOD FOR SWITCHING CLICK TO DIAL SERVICE TO MULTIMEDIA CONFERENCE SERVICE

(75) Inventors: Bin Guo, Guangdong Province (CN); Yuning Wu, Guangdong Province (CN); Yinjun Han, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 91 days.

(21) Appl. No.: 13/147,913

(22) PCT Filed: Jul. 31, 2009

(86) PCT No.: PCT/CN2009/073035
§ 371 (c)(1),
(2), (4) Date: Aug. 4, 2011

(87) PCT Pub. No.: WO2010/091567
PCT Pub. Date: Aug. 19, 2010

(65) Prior Publication Data
US 2011/0296033 A1    Dec. 1, 2011

(30) Foreign Application Priority Data
Feb. 12, 2009   (CN) .......................... 2009 1 0105447

(51) Int. Cl.
*G06F 15/16* (2006.01)
(52) U.S. Cl.
USPC ......................................................... 709/227
(58) Field of Classification Search
USPC .......................... 209/227; 709/227
See application file for complete search history.

(56) References Cited

U.S. PATENT DOCUMENTS

| 7,103,644 B1 | 9/2006 | Zhang et al. |
| 8,218,528 B2* | 7/2012 | Cai ............................... 370/352 |
| 2003/0067933 A1* | 4/2003 | Huffschmid .................. 370/412 |

(Continued)

FOREIGN PATENT DOCUMENTS

| CN | 1889603 A | 1/2007 |
| CN | 101159791 A | 4/2008 |

(Continued)

OTHER PUBLICATIONS

International Search Report for PCT/CN2009/073035 dated Sep. 30, 2009.

(Continued)

*Primary Examiner* — Kevin Bates
*Assistant Examiner* — Sm Rahman
(74) *Attorney, Agent, or Firm* — Banner & Witcoff, Ltd.

(57) ABSTRACT

The present invention discloses a system and method for switching click to dial (CTD) service to multimedia conference service. The method comprises: a CTD service is performed between one user equipment (UE) and another; an application serve invites at least one of the UEs and makes said at least one of the UEs take media negotiation with the media server so as to carry out the multimedia conference service, wherein the application server is in charge of realizing not only the CTD service but also the multimedia conference service. The application server invites at least one of the UEs and makes said at least one of the UEs take media negotiation with the media server so as to carry out the multimedia conference service, thus the limitation that extra UEs cannot be joined in the call in the CTD service is overcome.

5 Claims, 2 Drawing Sheets

(56) References Cited

U.S. PATENT DOCUMENTS

2003/0145054 A1* 7/2003 Dyke ............................ 709/205
2007/0140283 A1* 6/2007 Huang et al. .................. 370/412
2008/0080692 A1* 4/2008 Sylvain .................... 379/202.01

FOREIGN PATENT DOCUMENTS

| CN | 101488875 A | 7/2009 |
|---|---|---|
| WO | 2005041526 A1 | 5/2005 |
| WO | 2008038102 A2 | 4/2008 |

OTHER PUBLICATIONS

Supplemental European Search Report dated Mar. 24, 2014 in EP Application No. 09839890.2.
Rosenberg, et al., "Third Party Call Control in SIP," Internet Engineering Task Force, Internet Draft, Nov. 21, 2001, 24 pages.
Johnston, et al., "Session Initiation Protocol (SIP) Call Control—Conferencing for User Agents," Network Working Group, RFC 4579, the Internet Socitey, Aug. 2006, 43 pages.

* cited by examiner

SYSTEM AND METHOD FOR SWITCHING CLICK TO DIAL SERVICE TO MULTIMEDIA CONFERENCE SERVICE

TECHNICAL FIELD

The present invention relates to the field of network communication technology, and more especially, to a system and method for switching the click to dial (CTD) service to the multimedia conference service by using an application server in the next generation network environment.

BACKGROUND OF THE RELATED ART

The Next Generation Network (NGN) is more and more growing and introduces a series of totally new services. In the field of voice service, the combination of the NGN and the Internet brings users different service experiences.

The Click to Dial (CTD) service is a new service appeared in the development of network communication technology. In the CTD service, the user clicks the button or label on the webpage or software terminal in front of a PC to communicate with the contractor represented by the button or label. The CTD service is generally used in scenarios of consultation and customer service in the commercial websites.

In the prior art, however, the CTD service is limited to the communication between two parties, if there is need to contact and add a third party into the call, only one of the original two parties rather than both parties can be maintained at the same time. Alternatively, both original parties hang up, and one of them invites the other parties into the conference to achieve more than two party conference with the method for creating the multimedia conference in the prior art. This method, however, not only adds the complexity of user operation, but also reduces the attractive of the CTD service.

CONTENT OF THE INVENTION

In order to solve the restriction that the CTD service can only support communication between two parties, it is necessary to provide a system for switching the CTD service to the multimedia conference service to achieve communication among more than two parties.

In addition, it is also necessary to provide a method for switching the CTD service to the multimedia conference service to achieve the communication among more than two parties.

The system for switching the CTD service to the multimedia conference service in accordance with the present invention comprises at least one user equipment, one application server, one media server and one NGN, wherein, said UE and application server access said NGN, and said application server connects with said media server, said application server is in charge of the implementation of the CTD service, said media server is a device processing the signaling and media of the multimedia conference, said application server is also responsible for implementing the multimedia conference service, and it invites at least one of said UEs to make said UE take media negotiation with said media server so as to carry out the multimedia conference service.

In the above system, said NGN or IP-based Multimedia Subsystem (IMS) connects with said UEs and application server via SIP, and said application server connects with the media server via SIP.

The present invention also provides a console for switching the CTD service to the multimedia conference service, and said console works as the controlling party of the UE to display the status of the UE, and said console is configured to: when the CTD service is performed between one UE (can be any kind of terminals, such as the PC software terminal, fixed phone or cell phone) and another UE, if at least one UE needs to switch to the multimedia conference service, instruct the application server to switch to the multimedia conference service, said at least one UE accepting the invitation of the application server and taking media negotiation with said media server so as to carry out the multimedia conference service, wherein, said application server connects with said media server, and said application server is responsible for implementing the CTD service and multimedia conference service.

The present invention also provides an application server for switching the CTD service to the multimedia conference service, said application server connects with the media server, and it is configured to: when a CTD service is performed between one UE and another, if at least one of the UEs needs to switch said CTD service to the multimedia conference service, it invites said at least one of the UEs and makes said at least one of the UEs take media negotiation with the media server so as to carry out the multimedia conference service.

The method for switching the CTD service to the multimedia conference service in accordance with the present invention comprises the following steps:

Step 1: a CTD service is performed between one UE and another;

Step 2: the application server invites at least one of the UEs and makes it take media negotiation with the media server so as to carry out the multimedia conference service.

In the above method, said step 1 might comprise the following steps of:

step A: the console binding with said UE and displaying the status of said UE, and being responsible for initiating a CTD service;

Step B: said console initiating the CTD command to establish a call between said UE and the other.

In the above method, the process of the console binding with said UE in said step A comprises the following steps of:

said console sending a MESSAGE to said application server, and said MESSAGE including the terminal binding command; and said application server receiving said MESSAGE and returning a response to said console to complete the binding with the UE.

In the above method, the process of said console initiating the CTD command in step B might comprise the following steps of:

said console sends a MESSAGE to said application server, and said MESSAGE including the CTD command; and said application server receiving said MESSAGE, and calling the UE and another UE according to said CTD command.

In the above method, the application server invites at least one of the UEs in step 2, and moreover, it comprises: said application server receives the media description information of said at least one of the UEs.

In the above method, the process of said application server receiving the media description information of said at least one of the UEs comprises the following steps:

said console sending an INVITE to said application server to trigger the multimedia conference service;

said application server receiving said INVITE, and sending a re-INVITE to said at least one of the UEs; and said at least one UE receiving the re-INVITE and returning a 200 OK to said application server, and said 200 OK including the media description information of said at least one UE.

In the above method, the process of making said at least one of the UEs take media negotiation with the media server in step 2 comprises the following steps:

said application server receiving the media description information of said at least one of the UEs, and exchanging it with the media description information of said media server to make a relationship established between the media server and said at least one of the UEs according to the media description information of said UE;

said application server sending the media description information of said media server to said at least one of the UEs to make a relationship established between said at least one of the UEs and said media server according to the media description information of said media server; and said application server sending a multimedia conference establishment command to said media server, and said media server establishing a multimedia conference, and said application server adding said at least one of the UEs into said multimedia conference.

In the above method, said step of said application server exchanging the received media description information of said at least one of the UEs with the media description information of said media server comprises:

said application server sending an INVITE to said media server, and said INVITE including the media description information of said at least one of the UEs; and said media server returning a 200 OK to said application server, and said 200 OK including the media description information of said media server.

Compared with the prior art, the present invention overcomes the restriction that more UEs cannot be joined into the call service in the CTD service in the prior art, it provides a method for switching the CTD to the multimedia conference service, which cannot be implemented with the methods in the prior art, thus enriches the using experience of the users.

BRIEF DESCRIPTION OF DRAWINGS

The features and advantages of the present invention will be more evident after reading the detailed description of the embodiments of the present invention with reference to the accompanying figures.

PREFERRED EMBODIMENTS OF THE PRESENT INVENTION

The system and method for switching the CTD service to the multimedia conference service in accordance with the present invention will be illustrated with reference to the accompanying figures.

Figure 1:
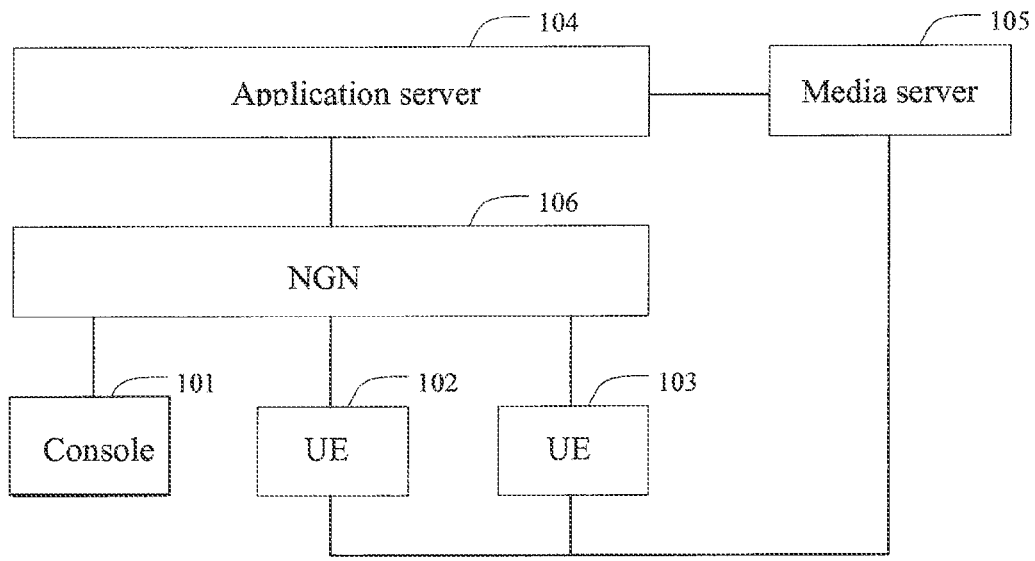
FIG. 1 is an illustration of the system for switching the CTD service to the multimedia conference service in accordance with the present invention.

Refer to FIG. 1, which is an illustration of the system for switching the CTD service to the multimedia conference service in accordance with the present invention.

Said system for switching the CTD service to the multimedia conference service comprises console 101, UE 102, UP 103, application server 104, media server 105 and NGN 106.

The console 101 is a terminal or a webpage that is responsible for interacting with the users, to initiate the CTD operation, and to switch to the multimedia conference.

The application server 104 is responsible for the service logic implementation of the CTD service and the multimedia conference service.

The media server 105 is responsible for processing the signaling of the multimedia conference.

The console 101, the UE 102, the UE 103, and the application server 104 access the NGN 106 via SIP, and the application server 104 connects with the media server 105 via SIP. There might be a plurality of media servers 105, and the application server 104 may control the load balance. In the multimedia conference service, audio and video streams are transferred between the media server 105 and the UE 102 as well as UE 103.

Figure 2:
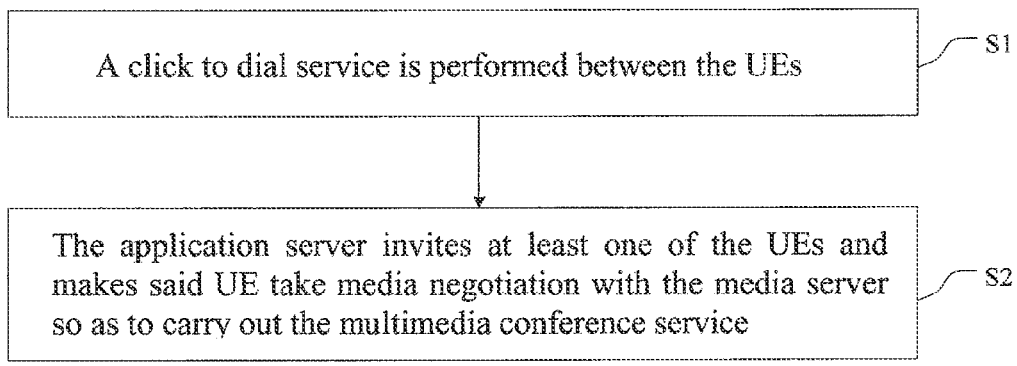
FIG. 2 is a flow chart of the method for switching the CTD service to the multimedia conference service in accordance with the present invention.

Refer to FIG. 2, which is a flow chart of the method for switching the CTD service to the multimedia conference service in accordance with the present invention.

Figure 3:
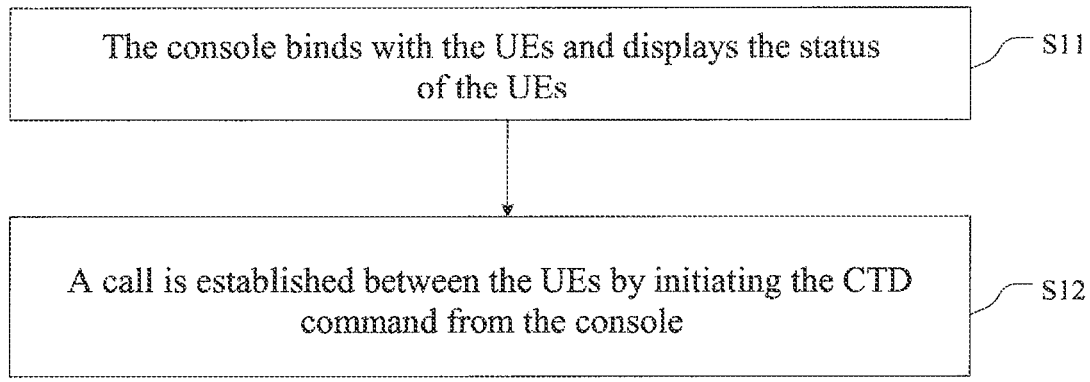
FIG. 3 illustrates the flow chart of step S1 in FIG. 2.

The method for switching said CTD service to the multimedia conference service comprises the following steps:

Step S1: a CTD service is performed between the UEs;

Refer to FIG. 3, which illustrates the specific flow chart of step S1 in FIG. 2.

Said step S1 comprises the following steps:

Step S11: the console 101 binds with the UE 102 and displays the status of the UE;

The console 101 sends a first MESSAGE carrying the command of request for binding with the UE 102, and the first MESSAGE is transferred to the application server 104 through the NGN 106 to trigger the CTD service.

The application server 104 receives the first MESSAGE and authenticates and authorizes the UE 102, and then sends the first MESSAGE response message to the console 101 to indicate that binding with the UE 102 by the console 101 is accepted. After the console 101 binds with the UE 102, the application server 104 reports the status of the UE 102 to the console 101 at any time and accepts commands from the console 101.

Step S12: said console 101 sends a CTD command to establish a call between the UEs.

The console 101 sends a second MESSAGE carrying the command of initiating a CTD call, and the MESSAGE is transferred to the application server 104 via the NGN 106 to trigger the CTD service.

The application server 104 receives the second MESSAGE, and sends the message of INVITE via the NGN 106 according to the command of initiating a CTD call carried in the second MESSAGE to call the UE 102. The UE 102 receives the INVITE and sends a 200 OK to the application server 104 via the NGN 106. Said 200 OK carries the media description information of the UE 102. The media description information is an example of the session description protocol (SDP) and is indicated as SPD in the following.

The application server 104 receives the second MESSAGE, and sends an INVITE via the NGN 106 according to the command of initiating a CTD call in the second MESSAGE to call the UE 103. Said INVITE carries the SDP of the UE 102. The UE 103 receives the INVITE and sends a 200 OK to the application server 104 via the NGN 106. Said 200 OK carries the SDP of the UE 103.

The application server 104 receives the 200 OK and sends an ACK message to the UE 103. The application server 104 also sends an ACK to the UE 102, while the ACK sent to the UE 102 carries the SDP of the UE 103. The UE 102 and UE 103 receive their own ACKs respectively to complete the negotiation between the SDP of the UE 102 and that of the UE 103, and a call is established between the UE 102 and the UE 103. Right now, the application server 104 sends a third MESSAGE to the console 101. The third MESSAGE carries the information of the status of the UE 102 and the UE 103.

Step S2: the application server 104 invites at least one UE and makes said UE make media negotiation with the media server 105 so as to carry out the multimedia conference service.

When a user needs to switch the CTD to the multimedia conference, he uses the console 101 to operate. The operation comprises steps such as inputting parameters such as the type of the conference, the number of attendants, conference duration and conference password, as well as clicking the OK button. The console 101 sends one INVITE to the application server 104 via the NGN 106 to trigger the multimedia conference service. Said INVITE carries the command of switching the CTD service to the multimedia conference service. The content of the command comprises the above parameters, the identifications of the UE 102 and the UE 103, as well as the SDP of the console 101. The command of switching the CTD service to the multimedia conference service is a piece of XML text.

The application server 104 receives said INVITE and sends a re-INVITE to the UE 102 and UE 103 respectively. The UE 102 receives the re-INVITE and returns a 200 OK. Said 200 OK carries the SDP of the UE 102. The UE 103 receives the re-INVITE and returns a 200 OK. Said 200 OK carries the SDP of the UE 103.

The application server 104 sends an INVITE to the media server 105. Said INVITE carries the SDP of the UE 102 and that of the UE 103. The media server 105 returns a 200 OK to the application server 104. Said 200 OK carries the SDP of the media server 105.

The application server 104 returns an ACK to the media server 105, and sends an ACK to the UE 102 and the UE 103 respectively at the same time. The ACK sent to the UE 102 and the UE 103 carries the SDP of the media server 105.

The application server sends a 200 OK to the console 101. Said 200 OK carries one piece of media description information that has no practical effect. The console 101 returns an ACK to the application server 104.

The application server 104 sends an INFO, that is, the command of creating a multimedia conference, to the media server 105, and the media server 105 creates a multimedia conference, and the application server 104 adds the UE 102 and the UE 103 into the conference to complete switching of the CTD service to the multimedia conference service.

It is easy to be considered if one of the two UEs, such as the UE 102, needs to have a multimedia conference service with other UEs, the service switch of only this UE can be implemented according to the above description of the present invention, and this UE can implement a multimedia conference service with other UEs. Moreover, the present invention also can be implemented in the IMS network environment instead of the NGN.

The above description is only preferred embodiments rather than the restriction of the scope of the present invention, and it should be pointed out that, for those skilled in the field, the description of the above scheme can be modified or improved. Without departing from the spirit and essence of the present invention, all these kinds of modification or variations should belong to the scope of the claims of the present invention.

INDUSTRIAL APPLICABILITY

Compared with the prior art, the present invention overcomes the limitation that no more than two UEs can be joined into a call in the CTD service, to do this, the present invention provides a method for switching the CTD to the multimedia conference service, which cannot be implemented with the methods in the prior art, thus enriches the using experience of the users.

What is claimed is:

1. A system for switching a click to dial (CTD) service to a multimedia conference service, comprising a console, an application server, at least two user equipment and a media server, wherein: the console is configured to send a first INVITE message to the application server via a Next Generation Network (NGN) to trigger the multimedia conference service if at least one user equipment needs to switch from the CTD service to the multimedia conference service, wherein said first INVITE message carries a command for switching the CTD service to the multimedia conference service and comprises a session description protocol (SDP) of the console, and return a third ACK message to the application server; the application server is configured to receive said first INVITE message, send a re-INVITE message to the at least two user equipment respectively, send a second INVITE message to the media server, wherein said second INVITE message carries the SDP that the application server has received, return a first ACK message to the media server, send a second ACK message to the at least two user equipment respectively at the same time, wherein said second ACK carries the SDP of the media server, send a third 200 OK message to the console, wherein said third 200 OK message carries a SDP that has no practical effect, send an INFO message, which is a command for creating a multimedia conference, to the media server, and add the at least two user equipment into the conference to complete switching of the CTD service to the multimedia conference service; each of the at least two user equipment is configured to receive the re-INVITE message and return a first 200 OK message, wherein said first 200 OK message carries the SDP of the corresponding user equipment; and the media server is configured to return a second 200 OK to the application server and create a multimedia conference, wherein said second 200 OK carries the SDP of the media server.

2. A method for switching a click to dial (CTD) service to a multimedia conference service, comprising: step 1: one user equipment performing the click to dial service with another user equipment; and step 2: if a user needs to switch from the CTD service to the multimedia conference service, a console sending a first INVITE message to an application server via a Next Generation Network (NGN) to trigger the multimedia conference service, wherein said first INVITE message carries a command for switching the CTD service to the multimedia conference service and comprises a session description protocol (SDP) of the console; the application server receiving said first INVITE message and sending a re-INVITE message to the at least two user equipment respectively; each of the at least two user equipment receiving the re-INVITE message and returning a first 200 OK message, wherein said first 200 OK message carries the SDP of the corresponding user equipment; the application server sending a second INVITE message to a media server, the media server returning a second 200 OK to the application server, wherein said second INVITE message carries the SDP that the application server has received, and wherein said second 200 OK carries the SDP of the media server; the application server returning a first ACK message to the media server, and sending a second ACK message to the at least two user equipment respectively at the same time, wherein said second ACK carries the SDP of the media server; the application server sending a third 200 OK message to the console, the console returning a third ACK message to the application server, wherein said third 200 OK message carries a SDP that has no practical effect; the application server sending an INFO message, which is a command for creating a multimedia conference, to the media server; the media server creating a multimedia conference; and the application server adding the at least two user equipment into the conference Lo complete switching of the CTD service to the multimedia conference service.

3. The method of claim 2, wherein said step 1 comprises:
   step A: the console binding with said user equipment and displaying a status of said user equipment, wherein, the console is responsible for initiating a click to dial service; and
   step B: said console initiating a click to dial command to establish a call between said user equipment and the other user equipment.

4. The method of claim 3, wherein the process of the console binding with said user equipment in said step A comprises the following steps of:

said console sending a MESSAGE to said application server, and said MESSAGE including a terminal binding command; and said application server receiving said MESSAGE and returning a response to said console to complete the binding with the UE.

5. The method of claim 3, wherein the process of said console initiating the click to dial command in step B comprises the following steps of:

said console sending a MESSAGE to said application server, and said MESSAGE including a click to dial command; and said application server receiving said MESSAGE, and calling the user equipment and another user equipment according to said click to dial command.

* * * * *